(12) United States Patent
Abdelaal

(10) Patent No.: US 12,332,854 B2
(45) Date of Patent: Jun. 17, 2025

(54) META-LEARNING SYSTEMS AND/OR METHODS FOR ERROR DETECTION IN STRUCTURED DATA

(71) Applicant: SOFTWARE AG, Darmstadt (DE)

(72) Inventor: Mohamed Abdelaal, Stuttgart (DE)

(73) Assignee: SOFTWARE GMBH, Darmstadt (DE)

( * ) Notice: Subject to any disclaimer, the term of this patent is extended or adjusted under 35 U.S.C. 154(b) by 323 days.

(21) Appl. No.: 17/560,688

(22) Filed: Dec. 23, 2021

(65) Prior Publication Data

US 2023/0205740 A1  Jun. 29, 2023

(51) Int. Cl.
  *G06F 16/215* (2019.01)
  *G06F 16/28* (2019.01)
  *G06F 18/23213* (2023.01)
  *G06N 20/00* (2019.01)

(52) U.S. Cl.
  CPC .......... *G06F 16/215* (2019.01); *G06F 16/284* (2019.01); *G06F 18/23213* (2023.01); *G06N 20/00* (2019.01)

(58) Field of Classification Search
  None
  See application file for complete search history.

(56) References Cited

U.S. PATENT DOCUMENTS

| | | | |
|---|---|---|---|
| 10,719,301 B1 * | 7/2020 | Dasgupta | G06F 8/34 |
| 10,884,893 B2 | 1/2021 | Sobran et al. | |
| 2005/0086193 A1 * | 4/2005 | Bolstad | G06F 16/258 |
| 2013/0166489 A1 * | 6/2013 | Jagota | G06N 5/02 |
| | | | 706/46 |
| 2014/0222349 A1 * | 8/2014 | Higgins | G16B 20/00 |
| | | | 702/19 |
| 2018/0314577 A1 * | 11/2018 | Gorjiara | G06F 11/36 |
| 2019/0019061 A1 * | 1/2019 | Trenholm | G06F 18/2411 |
| 2020/0327225 A1 * | 10/2020 | Nguyen | G06F 40/274 |

(Continued)

OTHER PUBLICATIONS

Rekatsinas et al., "HoloClean: Holistic Data Repairs with Probabilistic Inference," 2017 (Year: 2017).*

(Continued)

*Primary Examiner* — Yu Zhao
(74) *Attorney, Agent, or Firm* — Nixon & Vanderhye PC

(57) ABSTRACT

Certain example embodiments relate to meta-learning based error detection. Base classifiers are provided for historical attributes in historical datasets. Each is trained to indicate dirtiness of a value for the associated historical attribute. Clusters and a clustering model are generated using historical clustering features determined for each historical attribute, which are then associated with the clusters. For each dirty attribute in a dirty dataset, corresponding dirty clustering features are determined. The dirty attributes are assigned to the clusters using the corresponding determined dirty clustering features and the clustering model. The base classifiers associated with the clusters to which the dirty attributes were assigned are retrieved. Dirty features are extracted from the dirty dataset, and selectively modified. The extracted dirty features are applied to the retrieved the base classifiers to determine meta-features. A meta-classifier is trained using labeled meta-features. Predictions about the dirty dataset's dirtiness can be made using the meta-classifier.

20 Claims, 5 Drawing Sheets

(56) References Cited

U.S. PATENT DOCUMENTS

| | | | |
|---|---|---|---|
| 2021/0103858 A1 | 4/2021 | Padmanabhan et al. | |
| 2021/0133602 A1* | 5/2021 | Amrani | G06N 5/04 |
| 2021/0192335 A1* | 6/2021 | Das | G06N 20/00 |
| 2021/0319319 A1* | 10/2021 | Goyal | G06N 3/08 |
| 2022/0129486 A1* | 4/2022 | Gubanov | G06N 20/00 |

OTHER PUBLICATIONS

Qi et al. ("Inpacts of Dirty Data on Classification and Clustering Models: An Experimental Evaluation," Jun. 21, 2021) (Year: 2021).*

Larysa Visengeriyeva et al., "Metadata-Driven Error Detection", SSDBM '18, Jul. 9-11, 2018, Bozen-Bolzano, Italy, 13 pages.

Michele Dallachiesa et al., "Nadeef: A Commodity Data Cleaning System", SIGMOD '13, Jun. 22-27, 2013, 12 pages.

Zelda Mariet et al., "Outlier Detection in Heterogeneous Datasets Using Automatic Tuple Expansion" Computer Science and Artificial Intelligence Laboratory Technical Report, Feb. 8, 2016, 14 pages.

Zifan Liu et al., "Picket: Guarding Against Corrupted Data in Tabular Data During Learning and Inference", The VLDB Journal (2021), Oct. 12, 2021, 17 pages.

Mohammad Mahdavi et al., "Raha: A Configuration-Free Error Detection System" SIGMOD '19: Proceedings of the 2019 International Conference on Management of Data, Jun. 30,-Jul. 5, 2019, 18 pages.

Zhengjie Miao et al., "Rotom: A Meta-Learned Data Augmentation Framework for Entity Matching, Data Cleaning, Text Classification, and Beyond", SIGMOD/PODS '21: Proceedings of the 2021 International Conference on Management of Data, Jun. 20-25, 2021, 14 pages.

Larysa Visengeriyeva "Advancing Data Curation with Metadata and Statistical Relational Learning", Technical University of Berlin Research Degree Dissertation, Mar. 2020, 204 pages.

Ian Gemp et al., "Automated Data Cleansing Through Meta-Learning", Proceedings of the Twenty-Ninth AAAI Conference on Innovative Applications (IAAI-17), Feb. 2017, 2 pages.

Besim Bilalli et al., "Automated Data Pre-Processing via Meta-Learning", Model and Data Engineering (MEDI), Sep. 2016, 14 pages.

Michael Stonebraker et al., "Data Curation at Scale: The Data Tamer System", 6th Biennial Conference on Innovative Data Systems Research (CIDR '13), Jan. 6-9, 2013, Asilomar, California, 10 pages.

Felix Neutatz et al., "ED2: A Case for Active Learning in Error Detection", CIKM '19: Proceedings of the 28th ACM International Conference on Information and Knowledge Management, Nov. 2019, 5 pages.

Theodoros Rekatsinas et al., "HoloClean: Holistic Data Repairs with Probabilistic Inference", Feb. 2017, 13 pages.

Alireza Heidari et al., "HoloDetect: Few-Shot Learning for Error Detection", SIGMOD '19, Jun. 30,-Jul. 5, 2019, Amsterdam, Netherlands, 18 pages.

Xu Chu et al., "Katara: A Data Cleaning System Powered by Knowledge Bases and Crowdsourcing", SIGMOD '15, May 31,-Jun. 4, 2015, 15 pages.

Jean-Nicholas Hould "Craft Beers Dataset", electronically retrieved Dec. 23, 2021, 1 page. https://www.kaggle.com/nickhould/craft-cans.

Statista—What Significance does the Gathering, Analysis, and Utilization of Data for Decision-making Have for Your Company? electronically retrieved Dec. 23, 2021, 2 pages. https://www.statista.com/statistics/549678/worldwide-survey-significance-of-data-by-industry/.

Trifacta—The Data Engineering Cloud, electronically retrieved Dec. 23, 2021, 3 pages. https://www.trifacta.com/.

Mahdi Hashemi "Enlarging Smaller Images before Inputting into Convolutional Neural Network: Zero-padding vs. Interpolation", Journal of Big Data, vol. 6, Article No. 98, 13 pages (2019).

* cited by examiner

| $a_i$ | Metadata Features | | | Word2vec Features | | | TF-IDF Features | | | Labels |
|---|---|---|---|---|---|---|---|---|---|---|
| | $F_1$ | ... | $F_6$ | $F_7$ | ... | $F_n$ | $F_{n+1}$ | ... | $F_{n+m}$ | |
| $x_{i,1}$ | 1.0 | | 1.0 | -0.465147 | | 0.255167 | 0.000000 | | 0.538029 | 0 |
| $x_{i,2}$ | 2.0 | | 2.0 | 0.322944 | | -0.250771 | 1.0 | | 1.0 | 1 |
| $x_{i,3}$ | 1.0 | | 1.0 | -0.465147 | | 0.255167 | 0.000000 | | 0.538029 | 0 |
| ... | | | | | | ... | | | ... | ... |
| $x_{i,j}$ | 1.0 | | 4.0 | 0.448649 | | -0.188169 | 1.0 | | 1.0 | 1 |

Require: historical data $\mathcal{D}_{hist} = D_1, \cdots, D_N$, where $D_i = a_{i,1}, \ldots, a_{i,u}$, dirty dataset $D_{dirty} = a_1, \cdots, a_v$, base classifiers $\mathcal{M} = m_1, \cdots, m_q$ where $q = \sum_{i=1}^{N} |D_i|$, number of clusters $k$ for dataset $D_{dirty}$, number of TF-IDF features $\alpha_{hist}$ 1: for all dataset $D_i \in \mathcal{D}_{hist}$ do
2:     for all column $a_{i,j} \in D_i$ do
3:         Compute $F_{i,j}^{(cls)} \leftarrow$ *char_distribution*$(a_{i,j})$ & *metadata_profiler*$(a_{i,j})$
4:         Append $F^{(cls)} \leftarrow F_{i,j}^{(cls)}$         ▷ Extracting features for clustering
5:     end for
6: end for
7: Train $M_{cls}$, indices $\leftarrow$ *kmeans*$(F^{(cls)}, k)$     ▷ Clustering the columns in historical datasets
8: groupedModels $\leftarrow$ *mapper*(indices, $\mathcal{M}$)     ▷ Assign each base classifier to a corresponding cluster
    ▷ * Detection (Online) Phase *
9: for all column $a_i \in D_{dirty}$ do
10:     Compute $F_i^{(cls)} \leftarrow$ *char_distribution*$(a_i)$ & *metadata_profiler*$(a_i)$
11:     Append $F^{(cls)} \leftarrow F_i^{(cls)}$
12: end for
13: Assign cluster_index $\leftarrow$ *predict*$(F^{(cls)}, M_{cls})$
14: Estimate $\mathcal{M}_{dirty} \leftarrow$ groupedModels[cluster_index]     ▷ Find relevant base classifiers for $D_{dirty}$
15: for all column $a_i \in D_{dirty}$ do
16:     $F_i^{(tf\_idf)} \leftarrow$ *tf_idf*$(a_i)$
17:     if $|F_i^{(tf\_idf)}| < \alpha_{hist}$ then
18:         Compute $Z_i \leftarrow \alpha_{hist} - |F_i^{(tf\_idf)}|$     ▷ Shape of the zeros vector
19:         Generate $\overrightarrow{zeros} \leftarrow$ *zeros*$(Z_i)$
20:         $F_{i,new}^{(tf\_idf)} \leftarrow$ *Concatenate*$(F_i^{(tf\_idf)}, \overrightarrow{zeros})$     ▷ Zero padding
21:     end if
22:     Compute $F_i^{(dirty)} \leftarrow$ *wor2vec*$(a_i)$ & $F_{i,new}^{(tf\_idf)}$ & *metadata_profiler*$(a_i)$
23:     for all model $m_j$ in $\mathcal{M}_{dirty}$ do
24:         Estimate $F_i^{(meta)} \leftarrow$ *predict*$(F_i^{(dirty)}, m_j)$     ▷ Meta features generation
25:         Append $F^{(meta)} \leftarrow F_i^{(meta)}$
26:     end for
27:     Estimate $y_{train} \leftarrow$ *get_labels*$(F^{(meta)})$     ▷ Active learning
28:     Train $\mathcal{M}_{meta} \leftarrow$ *mlp*$(F^{(meta)}, y_{train})$
29:     Find $\mathcal{T}_{dirty} \leftarrow$ *predict*$(F^{(meta)}, \mathcal{M}_{meta})$     ▷ Error detection
30: end for

Fig. 6

META-LEARNING SYSTEMS AND/OR METHODS FOR ERROR DETECTION IN STRUCTURED DATA

TECHNICAL FIELD

Certain example embodiments described herein relate to techniques for error detection in potentially large and complex datasets. More particularly, certain example embodiments described herein relate to a multi-part meta-learning approach to detecting errors in potentially large and complex datasets including structured data.

BACKGROUND AND SUMMARY

These days, organizations of all types lean on data to fulfill the needs of their daily operations and to grow for the future. For instance, organizations in data-intensive industries such as, for example, the telecommunications, computer consulting (including software-as-a-service (SaaS)), online marketplace, logistics, energy, and other industries, collect various types of data, such as sensor readings, voice recordings, and images, to facilitate better decision-making, automate certain tasks that the organizations perform, understand performance, satisfy customers' requirements, etc. To gain these benefits, organizations typically leverage the collected data as inputs to analytics and business intelligence tools, e.g., to extract "hidden" patterns, attempt to foresee trends and future events, etc. The conclusions drawn from such analytics tools can be misleading, however, when the collected data involves errors. In most cases, real-world data contains heterogeneous "error profiles" that may emerge while collecting or transferring the data. For instance, combining data from different sources may result in missing values, duplicate values, outliers, inconsistences, violation of business and integrity rules, and/or the like. Each of these categories is an error profile. Accordingly, as will be understood by those skilled in the art, it is desirable to improve the data quality for collected data, especially for large and potentially complex datasets, so that information and actions based on such data can be better trusted. Indeed, there is a desire to manage collected data so that it can be deemed "error-free" which, although not necessarily true as an absolute proposition, can be an important perquisite for at least some data-driven applications.

Recently, several data error detection techniques and tools have been introduced to try to automatically address data quality problems. Error detection refers generally to the computer-mediated process of traversing a dataset in search of erroneous data samples. Error detection can be performed as a one-shot process, or as an iterative process, depending on the context. Data repair, on the other hand, refers generally to the computer-mediated process of replacing erroneous data samples with generated values close to the "ground truth." In this context, the term "ground truth" denotes the actual error-free values of a dataset. Instead of replacing erroneous samples, some data repair strategies opt for omitting them (e.g., as may be the case with some duplicate cleaning and outlier repair techniques).

It is believed that the majority of current data error detection techniques and tools have been designed to tackle individual error types. For instance, some rule-based detection techniques are designed to tackle rule violation errors through enforcing functional dependencies and integrity constraints. Similarly, some pattern enforcement and transformation approaches aim to discover syntactic and semantics patterns in the data, before leveraging the discovered patterns to detect inconsistences. To detect outliers, some quantitative error detection algorithms employ statistical algorithms, including histograms, Gaussian, and multivariate Gaussian mixtures. Such algorithms in some instances can discover data samples that do not follow the statistical distribution of the broader dataset. And some record linkage and deduplication approaches perform entity consolidation when multiple samples comprise data for the same entity. As will be appreciated by those skilled in the art, these approaches do not use machine learning for error detection or data repair and, generally speaking, are unsupervised error detection techniques and tools.

As is understood by those skilled in the art, "dirty data" typically refers to low-quality data samples that contain one or more error types. Examples of the error types include duplicates, outliers, constraint/rule violations, implicit missing values, explicit missing values, inconsistences, typos, formatting issues, mislabeling, etc. By contrast, as is understood by those skilled in the art, "clean data" typically refers to high-quality data samples collected without error profiles, or at least higher-quality data samples compared to dirty data. Clean data additionally, or alternatively, may refer to dirty data that has been "cleaned" (i.e., dirty data that has had at least some of its error profiles addressed). Clean data samples may achieve a set of application-relevant quality metrics such as completeness, accuracy, timeliness, uniqueness, and consistency. As is known, data cleaning (also sometimes referred to as data cleansing or data curation) involves detecting and repairing erroneous samples in a dataset.

Typical real-world datasets have heterogeneous error profiles. To tackle heterogeneous error profiles, several attempts have been made to develop more holistic error detection techniques and tools. FIG. 1 depicts the architecture of a typical semi-supervised error detection approach. A feature vector is generated via automatic featurization 104 for each column of data in a dirty dataset 102. Afterward, an "oracle" is asked to provide labels 106 for a set of selected data samples, i.e., to identify whether the selected samples are erroneous or clean. The oracle in this context may be an authorized human user with domain or other knowledge, and thus may be "qualified" to provide such labels. Finally, a classifier is trained on the labeled samples 108 before using it to perform error detection 110 to estimate the labels for other unlabeled data samples. To implement this kind of strategy, a set of unsupervised error detection techniques and tools can be used to generate the feature vector. Similarly, metadata-driven error detection can be used to extract a set of metadata to drive the training process. To further improve the detection performance, model properties can be made to correspond to attribute-level, tuple-level, and dataset level features that describe the distribution governing the dataset.

Different strategies can be adopted to try to avoid the need to manually provide labels. For instance, one approach involves clustering the samples by similarity and acquiring labels on a per-cluster basis, before propagating the acquired labels to the data items in each cluster. Another approach involves active learning to acquire labels for clean or erroneous samples that the model is uncertain about. In one approach, the labeling effort is reduced via augmenting the dirty samples, e.g., by learning the observed error patterns before applying the patterns to generate synthetic erroneous samples. Finally, still another approach involves employing self-supervision to learn an error detection model that can be applied during training or testing, e.g., in an effort to try to entirely avoid users' interventions and without leaning on any external labels.

Meta-learning refers to machine learning algorithms that learn from the output of other machine learning algorithms A meta-learning approach has been used to assist users by recommending a set of data transformations in ML pipelines, e.g., discretization, normalization, and standardization, depending on their impact on the prediction performance Meta-learning also has been used in connection with a data augmentation framework for a range of data management tasks, with more training samples being provided via data augmentation. In this case, meta-learning is adopted to reduce the search space, which contains all possible configurations, while performing data augmentation. A meta-learner also has been used to enable the selection of an ensemble of machine learning models from among several candidates. And a classifier has been used to identify bugs in crowd-sourced log files.

Unfortunately, current data cleaning and error detection techniques and tools have several shortcomings. These shortcomings embed technical deficiencies and limit widescale applicability of such approaches.

For example, the provision of cleaning signals, e.g., functional dependencies and integrity constraints, and proper configurations to the unsupervised data cleaning methods is typically a cumbersome task. And such a task typically is to be performed by data experts capable of extracting and properly formulating the cleaning signals and configurations. Moreover, the precision of such approaches (e.g., the fraction of relevant instances or, for example, the actual "noisy cells" among the detected instances) generally depends on the quantity and quality of the provided configurations and cleaning signals. For example, if a rules-based approach is provided with insufficient or low-quality integrity constraints, it cannot precisely and reliably detect the existing errors in a dirty dataset. In addition, the detection recall of the unsupervised data cleaning approaches (e.g., the fraction of noisy data samples that are detected) is usually low because only specific error types are targeted while other error types that exist in real-world datasets are overlooked. This is a first set of technical challenges associated with current technologies.

As another example, semi-supervised data cleaning techniques and tools generally are "blind" in the sense that they typically overlook context information and historical knowledge that can help in making the right cleaning decisions throughout the lifecycle of machine learning projects. In fact, as the inventor has recognized, historical knowledge, embedded in previously-cleaned datasets, can be a generous source of information that can be used with other dirty datasets to identify the erroneous samples. Yet semi-supervised data cleaning techniques and tools typically do not leverage this rich source of information.

And semi-supervised approaches also usually require long execution times before erroneous data samples can be identified. These execution times can be deemed unacceptable or excessive in connection with some applications. For instance, some current tools can solely be used with small-sized datasets (e.g., several thousand data samples), and other tools can require relatively long times to generate the cleaning strategies later used for creating the feature vectors.

Certain example embodiments help address the above-described and/or other technical challenges. For example, certain example embodiments provide improved techniques for error detection in potentially large and complex datasets.

One aspect of certain example embodiments relates to leveraging a meta-learning approach for error detection in structured data. In a meta-learning approach according to certain example embodiments, a knowledge extraction phase is used to train a set of machine learning (ML) models to differentiate between erroneous and clean samples in historical datasets, and a detection phase is used to match a new dirty dataset with a set of the historical datasets and to use the corresponding models to generate a feature vector for a meta-classifier. The features in the feature vector in this case thus represent the predictions obtained from the base classifiers (i.e., the set of classifiers trained on the historical datasets). Certain example embodiments help overcome technical challenges by implementing a zero-padding mechanism and a clustering approach to group the base classifiers in the knowledge extraction phase. As will be appreciated from the detailed discussion below, zero padding may involve appending the feature vector with zeros, e.g., to fix the size of feature vectors and to make them more usable (or at least more easily usable) with subsequent operations in the meta-learning approach of certain example embodiments.

Advantageously, certain example embodiments do not need to lean on an ensemble of error detection approaches, and certain example embodiments therefore do not require pre-configurations or cleaning signals to detect errors in a dirty dataset. Instead, certain example embodiments involve generating feature vectors using a set of statistical and integrity properties of the data that precisely describe the distribution governing a dataset. Such properties can be captured by a classifier to discriminate between erroneous and clean data samples. Thus, certain example embodiments advantageously can reduce the burden of preparing and estimating the optimal or at least improved data preparation configurations. That is, data preparation, or the tasks associated with the pre-processing of datasets before they are used as inputs to predictive models that typically comprise data annotation, data cleaning, data transformations, feature extraction, etc., can be greatly facilitated and potentially even eliminated. Moreover, certain example embodiments have been found to have higher recall as a result of the consideration of the distribution of the data. In other words, certain example embodiments do not necessarily need to target a specific error type.

Instead, they can search for erroneous samples that do not conform with the distribution of the data. This technical approach also has been found to achieve higher precision, as a result of the ability to avoid the need for external configurations or cleaning signals. For instance, certain example embodiments have achieved on average 92% higher precision and 74% higher recall compared to the KATARA error detector for the "craft beers dataset" with a 16% error rate.

Certain example embodiments leverage the concept of meta-learning to exploit historical datasets that have been cleaned in previous cycles of the same project or other similar projects. Accordingly, it becomes possible to exploit the knowledge in these historical datasets to identify the error profile(s) in newly collected datasets in a more holistic manner. As a result, certain example embodiments move the burden of training a relatively complex error detection classifier from the online phase to the offline phase. Because these operations can be performed offline, practitioners and data scientists are provided with the opportunity to adopt more sophisticated machine learning and deep learning models, which are likely to be impractical for online operations. In this context, the offline phase denotes the set of processes performed on historical datasets, and the online phase represents the processes executed on the dirty data to identify the erroneous samples.

Because certain example embodiments leverage a set of pre-trained base classifiers to generate the meta-features, they can offer an approach for controlling the overall execution time via adjusting the number of clusters in the offline phase. For instance, increasing the number of clusters from 1 to 16 has been found to reduce the overall execution time by about 63% for the craft beers dataset mentioned above.

In certain example embodiments, meta-learning is leveraged to detect erroneous tuples in structured data without making any transformations on the input dataset. Moreover, historical knowledge embedded in similar datasets (including design-time knowledge embedded in historical datasets) is used to help detect errors. To this end, meta-learning is directly used to "transfer" the knowledge from the historical datasets to the new dataset. The historical knowledge is used in generating feature vectors, and the representation mechanisms used to generate features for the base- and meta-classifiers. As will be appreciated from the detailed discussion below, certain example embodiments are able to leverage representation learning mechanisms such as, for example, metadata, Word2vec, and TF-IDF, as well as zero padding to preserve the shape of the feature vectors for the base- and meta-learners.

In certain example embodiments, a method of training a meta-learning based error detection system is provided. In this approach, access is provided to historical datasets that each include historical data and historical data attributes, as well as a base classifier for each historical attribute in each of the historical datasets. The datasets may be stored to a data store (backed by a non-transitory computer readable storage medium in any suitable format), which may be internal or external to the computing system training the meta-learning based error detection system. Each base classifier is trained to indicate whether a data value for the historical attribute associated with the respective base classifier is clean or dirty. Historical clustering features are determined for each historical attribute in each historical dataset. A plurality of clusters and a clustering model are generated based on the determined historical clustering features, with the historical attributes being associated with the clusters. A dirty dataset that includes dirty data and dirty attributes is accessed (e.g., from the same or a different data store that may be backed by the same or different non-transitory computer readable storage medium in any suitable format and that may be internal or external to the computing system training the meta-learning based error detection system). For each dirty attribute in the dirty dataset, corresponding dirty clustering features are determined. Each of the dirty attributes is assigned to one of the clusters based on the corresponding determined dirty clustering features and the clustering model. The base classifiers associated with the clusters to which the dirty attributes were assigned are retrieved. Dirty features are extracted from the dirty dataset, and the extracted dirty features are selectively modified to conform them expected inputs to the retrieved base classifiers. The extracted dirty features are applied to the retrieved the base classifiers to determine a set of meta-features. Labels are obtained for the determined meta-features (e.g., via an interface such as an API, user interface, or the like). A meta-classifier is trained based on the labeled meta-features in training the meta-learning based error detection system. A prediction can be made about the dirtiness of the dirty dataset based on the trained meta-classifier. It will be appreciated that these operations may be performed in connection with a computing system including at least one processor and a memory, the processor being configured to perform instructions corresponding to the various operations. That computing system may be the same as, or separate from, the computing system(s) on which the historical datasets, the dirty dataset, and/or optional computer-implemented analysis tools are stored.

According to certain example embodiments, the historical datasets may be structured datasets (e.g., stored in a database such as, for example, a relational database or the like).

According to certain example embodiments, the historical and/or dirty clustering features may include distribution information and/or metadata associated with the corresponding historical and/or dirty attributes, respectively.

According to certain example embodiments, the clusters and the clustering model may be generated using a K means clustering algorithm.

According to certain example embodiments, the selective modifying may include applying zero-padding to match an expected dimension of the retrieved base classifiers.

According to certain example embodiments, active learning may be used to limit the number of labels to be obtained from an expert in connection with the obtaining of labels for the determined meta-features.

According to certain example embodiments, the meta-classifier may be trained using a multi-layer perceptron (MLP) algorithm.

According to certain example embodiments, the meta-classifier may be configured to generate indications of data cells in the dirty dataset that are erroneous.

Certain example embodiments relate to a method of repairing data in a dirty dataset, e.g., with the method comprising using the meta-learning based error detection system disclosed herein to make predictions about the dirtiness of the dirty dataset based on the trained meta-classifier; and generating a set of repair candidates based on the predictions made. In certain example embodiments, the repair candidates may be generated based on a machine-learning based imputation, deduplication, and/or holistic data repair algorithm.

Certain example embodiments relate to a meta-learning based error detection system. At least one processor and a memory are provided. The at least one processor is configured to at least: access, from a first data store, historical datasets that each include historical data and historical data attributes, as well as a base classifier for each historical attribute in each of the historical datasets, each base classifier being trained to indicate whether a data value for the historical attribute associated with the respective base classifier is clean or dirty, wherein historical clustering features are determined for each historical attribute in each historical dataset, and wherein a plurality of clusters and a clustering model are generated based on the determined historical clustering features, the historical attributes being associated with the clusters; access, from a second data store, a dirty dataset that includes dirty data and dirty attributes; for each dirty attribute in the dirty dataset, determine corresponding dirty clustering features; assign each of the dirty attributes to one of the clusters based on the corresponding determined dirty clustering features and the clustering model; retrieve the base classifiers associated with the clusters to which the dirty attributes were assigned; extract dirty features from the dirty dataset, and selectively modify the extracted dirty features to conform them expected inputs to the retrieved base classifiers; apply the extracted dirty features to the retrieved the base classifiers to determine a set of meta-features; obtain labels for the determined meta-features; train a meta-classifier based on the labeled meta-features in training the meta-learning based error detection system; and enable a prediction to be made about the dirtiness of the dirty dataset based on the trained meta-classifier.

Also contemplated herein are non-transitory computer readable storage media tangibly storing instructions that, when performed by a processor of a computing system, perform the methods disclosed in detail.

The features, aspects, advantages, and example embodiments described herein may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 6 is pseudo-code for an error detection approach in accordance with certain example embodiments.

DETAILED DESCRIPTION

Figure 1:
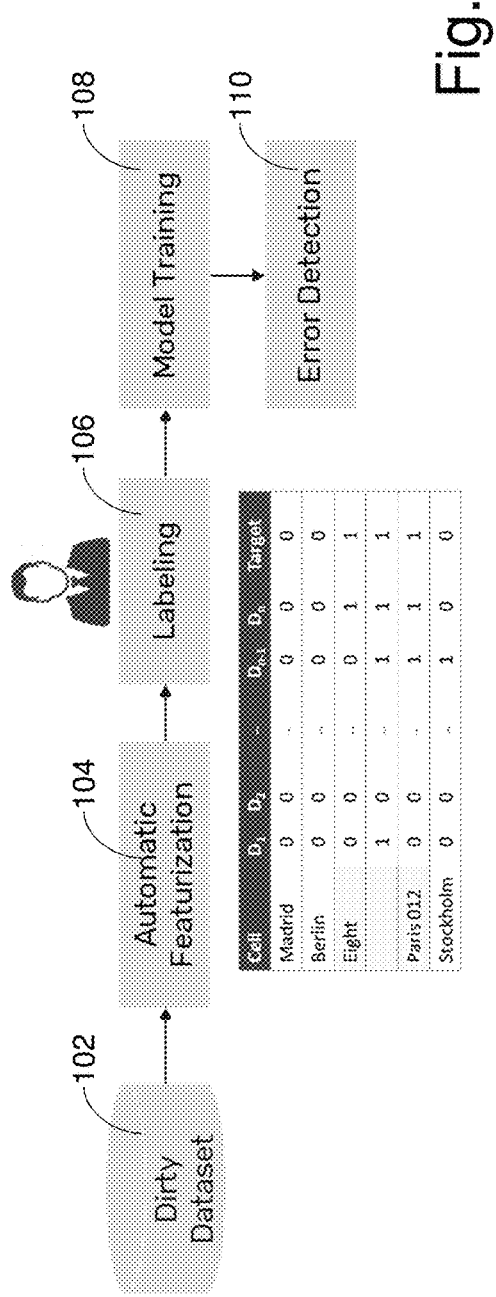
FIG. 1 depicts the architecture of a typical semi-supervised error detection approach.

Certain example embodiments provide automated, computer-based error detection and correction techniques that leverage machine learning (ML) technology. In certain example embodiments, the task of error detection is formulated as a classification problem. With this conceptual frame, design-time artifacts are exploited when generating features used to train a detection classifier. Meta-learning helps "transfer knowledge" from a set of historical, previously-repaired datasets to the new datasets to be cleaned (e.g., to the dirty datasets). Certain example embodiments employ a multi-phase approach including a knowledge extraction phase and a detection phase. In the knowledge extraction phase, a set of ML models is trained to differentiate between erroneous and clean samples in the historical datasets. The detection phase matches the new dirty dataset with a set of the historical datasets, and uses the corresponding models to generate a feature vector for a meta-classifier. In this case, the features in the feature vector represent the predictions obtained from the base classifiers associated with the historical datasets. Certain example embodiments enable a realistic meta-learning approach to be realized by overcoming technical challenges associated with having a varying-length feature vector, and with having "irrelevant knowledge." To help address these technical challenges, certain example embodiments implement a zero-padding mechanism and a clustering approach to group the base classifiers in the knowledge extraction phase. Thus, it is possible to leverage meta-learning for error detection in structured data.

As will be appreciated from the description above, and as will become clearer from the description below, certain example embodiments exploit knowledge embedded in historical datasets in order to detect errors in other potentially similar datasets. To help understand how this approach may be accomplished, consider an example involving a smart city application in which traffic data is to be collected from sensors located in the streets of a city such as Berlin, e.g., to alert users where there are traffic jams, to enable GPS-enabled to make predictions about and find routes between different waypoints, etc. Assume, for the purposes of this illustration, that the municipality of Berlin has already had several data experts receive sensor data, and that those data experts have detected errors in the collected data, including errors such as missing values and outliers. Missing values may be related to a sensor going offline temporarily and not reporting traffic flow at a predefined interval, and outliers may be related to abnormally high traffic congestion because of an unplanned road closure, or the like. Either or both errors could result from bad weather conditions, sensors malfunctioning, and/or a host of other possible root causes. Assume that the municipalities of other cities admire the smart city application, as it has been used to reduce traffic jams and harmful emissions in Berlin, and these other municipalities have decided to implement the same project in their cities. The collected data in these other cities will be expected to share several characteristics with the data collected in Berlin, as similar sensors are arranged in these cities. The similar data may include the same type of sensor data, data suggesting light traffic during shared public holidays, bad traffic during storms that affect broad areas, etc. Because these similarities exist, the knowledge gained while cleaning the data collected in Berlin can be used to clean the new, dirty data from other cities potentially without user intervention. Thus, it becomes possible for certain example embodiments to detect errors in the collected data for the new cities without the need to hire data experts, as will become clearer from the below.

Figure 2:
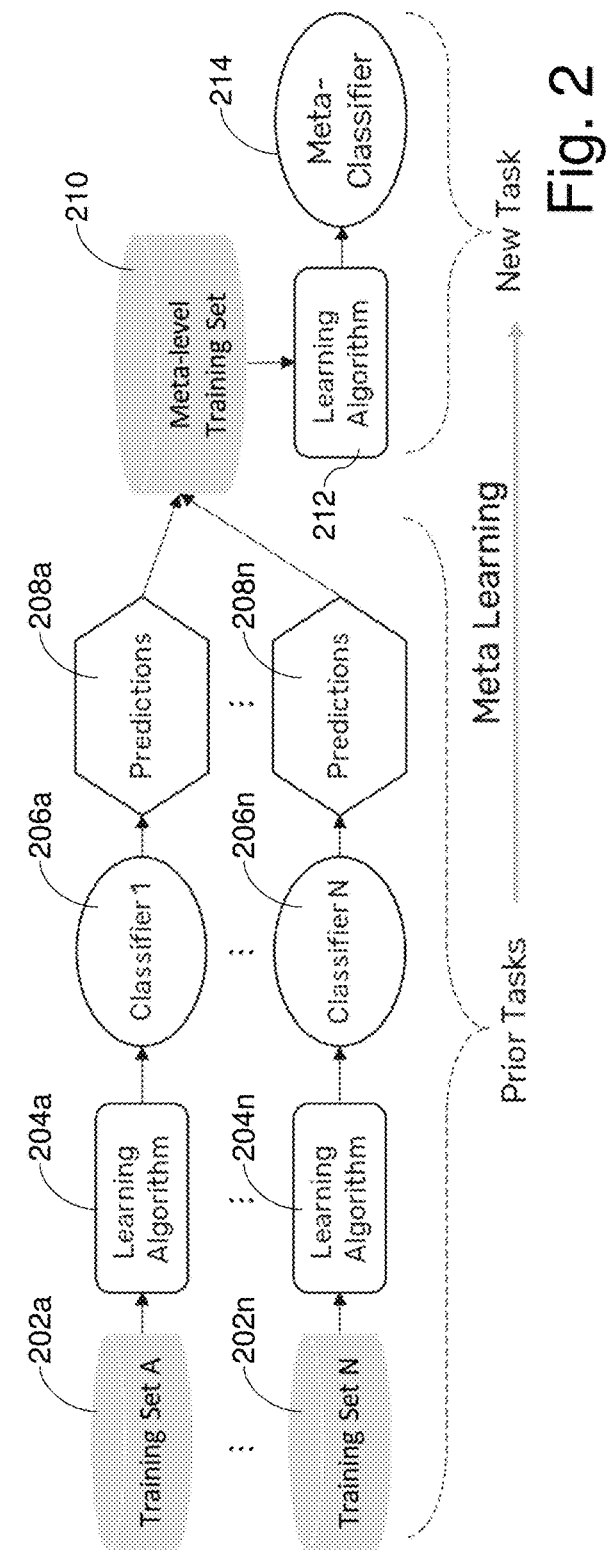
FIG. 2 is a diagram showing how a meta-learning system typically works.

The concept of meta-learning is used to transfer learned knowledge between different tasks. In general, meta-learning is used to learn new concepts and skills fast with relatively few training examples. Conventional machine learning models typically involve training on a single task and testing on defined or accepted examples related to that task. By contrast, meta-learning algorithms teach themselves via being exposed to many tasks and by being tested on their abilities to learn different but related tasks. Meta-learning thus typically exploits pre-trained models that have been used for prior tasks to achieve higher model prediction accuracy, faster and less computationally intensive training, and more generalized (more broadly applicable) models. In a formalistic sense, a set of base classifiers $C_1, \ldots, C_N$ are trained using training datasets $D_1, \ldots, D_N$ collected from prior tasks. For a new unseen task T with few training examples $D_T$, the base classifiers $C_1, \ldots, C_N$ can generate a rich feature vector $F_T \in \mathbb{R}^m$, where m is the size of the feature vector and $\mathbb{R}$ is the set of all real numbers. To generate predictions, the meta-features $F_T$ are exploited for training the so-called meta-classifier $C_{meta}$. In a perhaps less formalistic approach, FIG. 2 is a diagram showing how a meta-learning system typically works. That is, FIG. 2 shows meta-learning applied to prior tasks to learn a new task. Training sets 202a-202n are used to generate learning algorithms 204a-204b. These learning algorithms 204a-204n correspond with base classifiers 206a-206n, which can be used to generate predictions 208a-208n. This already-generated historical information is taken as a part of a meta-level training set 210. The meta-learning algorithm 212 learns on this data, and a meta-classifier 214 is generated for the new task.

Figure 3:
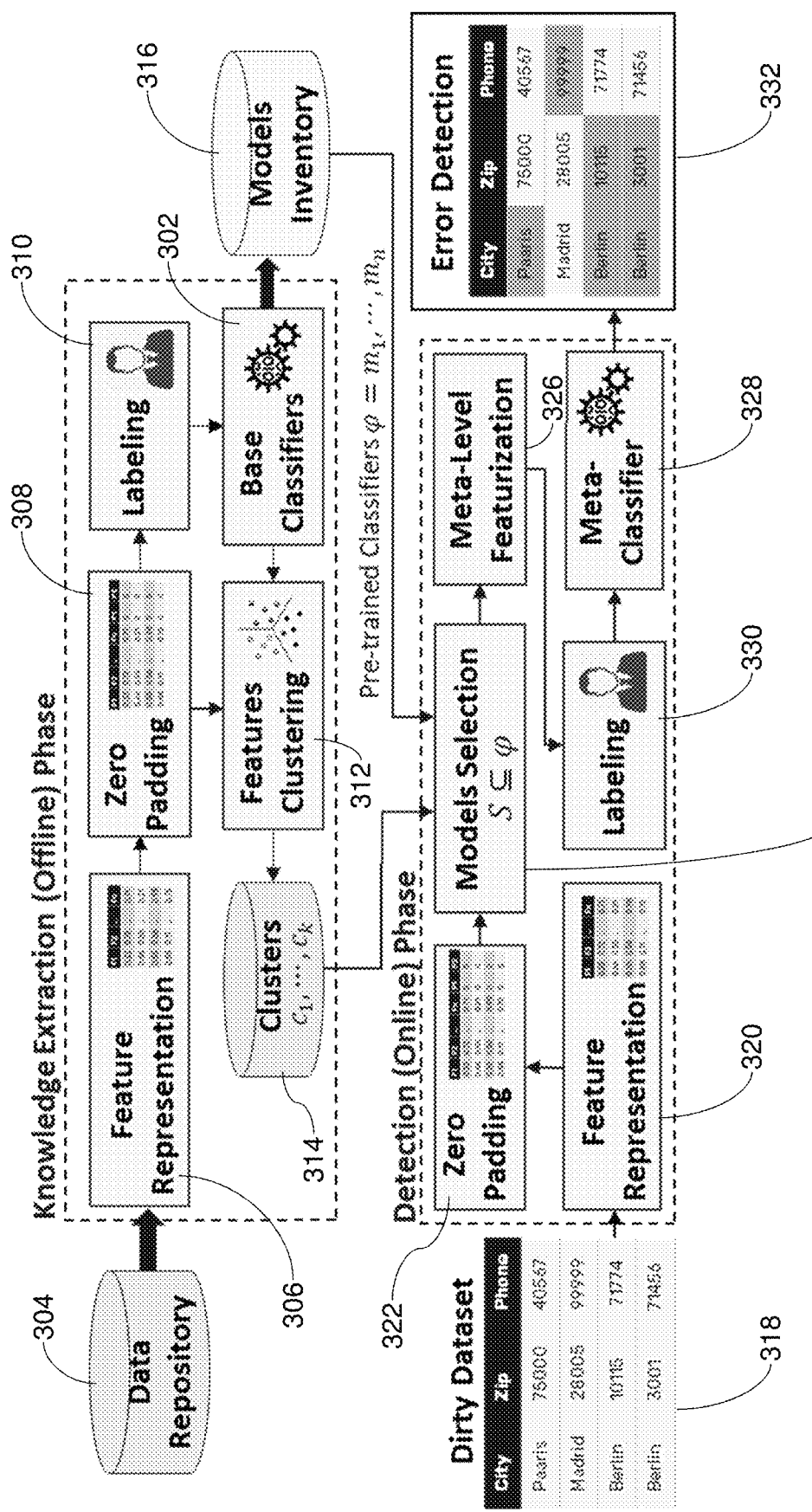
FIG. 3 is a block diagram depicting an example architecture of certain example embodiments.

Meta-learning helps overcome shortcomings of current error detection techniques and tools by, among other things, exploiting knowledge from similar data cleaning tasks. To this end, the error detection approach of certain example embodiments is separated into different phases, including a knowledge extraction phase and a detection phase. FIG. 3 is a block diagram depicting an example architecture of certain example embodiments. The knowledge extraction phase if FIG. 3 comprises a set of offline processes and generates a set of base classifiers 302. These base classifiers 302 learn how to differentiate between clean and dirty samples. To this end, learning algorithms (e.g., neural networks, XGBoost, random forest, and/or the like) are used, and data is labeled, for samples in each historical dataset. A data repository 304 stores these historical datasets. The data repository 304 may be any data store backed by any suitable computer readable medium. For example, the data repository may be structured as a relational database or the like. As is known to those skilled in the art, labeling can involve users or data experts providing labels used in certain supervised prediction tasks. If user involvement collects a small set of labels, the process is then typically called semi-supervised classification. As will become clearer from the description below, semi-supervised classification can be used in certain example embodiments to reduce the human intervention. In this case, each label represents a Boolean value of whether the data sample is erroneous. Such labels represent the output of previous cleaning tasks on the historical datasets.

For each column in the historical datasets stored in the data repository 304, a set of methods, functions, modules, and/or the like, are programmed to automatically extract a set of features representing the content of each such column. In this regard, the feature representation module 306 extracts metadata and distributional values that can precisely describe the data being processed, as described in greater detail below. A zero padding module 308 pads the features as appropriate, labeling is practiced with a labeling module 310, and the base classifiers 302 are generated for the columns.

After generating the base classifiers 302 of the columns, a clustering algorithm 312 is performed on the extracted features. For example, a K-Means clustering, hierarchical clustering, or other clustering approach is employed to group the base classifiers 302 and feature vectors of similar columns. A number of clusters 314 are generated, and the number of clusters to be generated may be configured in certain example embodiments. The number of clusters may be used as a "knob" for controlling the speed of execution. In this regard, a small number of clusters indicates that more base classifiers are to be used in the detection phase. On the other hand, selecting a large number of clusters implies that only a small fraction of the base classifiers is to be utilized in the detection phase. Accordingly, it is possible to trade off the detection accuracy for the overall execution time. In fact, one advantage of having an offline phase relates to the ability to use sophisticated learning algorithms to generate the base classifiers without necessarily being limited by the detection latency and the need to wait for expert knowledge to be embedded in the generated base classifiers as a part of the labeling. The trained base classifiers 302, the feature vectors, and their clusters 314 are stored in a model inventory 316. That is, the models inventory may be thought of as being a directory for storing the base classifiers 302 in a suitable format, together with a linkage to their corresponding feature vectors. The base classifiers may, for example, be stored as pickle files, and the feature vectors may be stored as csv files. Different formats are possible in different example embodiments.

The detection phase is a set of online processes that make use of the base classifiers 302 in detecting erroneous data samples in other similar datasets. For instance, the dirty dataset 318 in FIG. 3 has different error types including typos (see "Paaris" vs. "Paris"), explicit missing values (see "99999" entry), and violations of functional dependency rules (see Berlin zip codes). To detect such errors, the detection phase begins with extracting the metadata, word embedding features, and distribution features (i.e., TF-IDF) for each column in the dirty dataset via an online feature representation module 320. An online zero padding module 322 is invoked. To avoid performance degradation due to the existence of irrelevant classifiers, the generated feature vector of each column is used to identify the most similar columns in the historical datasets. Accordingly, the invoked base classifiers are limited to only those that have a high similarity with the new dirty data (e.g., a similarity above a predefined or configurable threshold amount). As explained in greater detail below, a subset of the models are selected 324 and meta-level featurization 326 is performed. Meta-level features refer to the set of features automatically generated through using a dataset as an input to the base classifiers, and they can include other dataset-specific features such as the dataset's metadata and distribution. To train the meta-classifier 328, a small set of labels 330 is collected from an expert. In this regard, an active learning approach is used to select only a few representative data samples that can contribute to the fast convergence of the meta-classifier 328. Active learning prioritizes the data samples that need to be labeled to yield the highest impact to training a supervised model. Active learning is typically used in situations where the size of the data to be labeled is relatively large. In these situations, prioritization is advantageous because data can be labeled in a more effective manner, especially where available resources are potentially limited. After the meta-classifier 328 is trained, it can be used to identify erroneous cells such as those highlighted in the error detection table 332 in FIG. 3. Accordingly, the output can be provided in the form of a table or other structure (e.g., a CSV file or the like) containing the indices or other identifications of the erroneous cells. This structure can be then used as an input to a data repair algorithm, e.g., imputation, deduplication, or rules/constraints enforcement, to generate a repair candidate for each detected erroneous cell. For instance, if a detected cell represents an outlier, the repair algorithm can either remove that cell or utilize an imputation method to generate a repair candidate. Thus, the datasets used as input to the predictive models will be of high quality, which in turn improves the prediction performance.

The implementation section that follows provides a more detailed explanation of each element in the FIG. 3 architectural diagram.

EXAMPLE IMPLEMENTATION

Details concerning an example implementation are provided below. It will be appreciated that this example implementation is provided to help demonstrate concepts of certain example embodiments, and aspects thereof are non-limiting in nature unless specifically claimed. For instance, the code snippets, clustering algorithms, padding approaches, feature extractors, etc., are provided below to ease understanding of the example embodiments described herein and are not limiting unless explicitly claimed.

Example Feature Representation Related Techniques

Figures 4, 5:
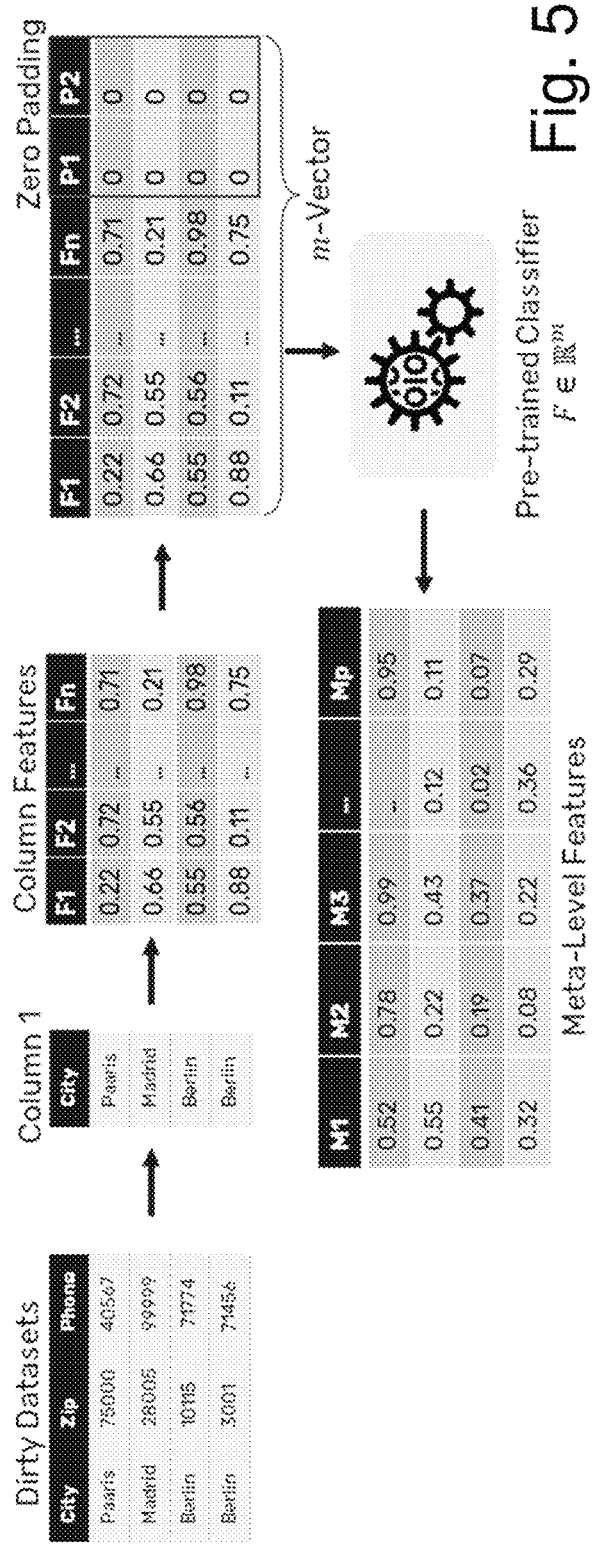
FIG. 4 is a table showing features extracted for each column in example historical and the dirty datasets in accordance with certain example embodiments.
FIG. 5 shows the generation of feature vectors, including zero padding, in accordance with certain example embodiments.

Certain example embodiments extract a representative set of features that precisely describe the distribution governing each column in the historical datasets and in the dirty datasets. To this end, different techniques may be used to automatically extract these features. These techniques may include, for example, a metadata profiler, Word2vec, and TF-IDF. FIG. 4 is a table showing features extracted for each column in example historical and the dirty datasets in accordance with certain example embodiments. To generate these features, the metadata profiler traverses each column in the dataset to compute several parameters, such as the frequency of a value in the column, whether the value is numeric, the number of characters in the value, whether the value is alphabetic, an extracted number if the value is numeric, etc. This metadata can provide insights into the structure of the data in each column. The metadata profiler may be implemented as a part of the feature representation module in certain example embodiments, and these and/or other metadata features can be extracted, extended, and/or otherwise modified in different example embodiments. The metadata profiler, and the modules discussed herein, thus may be implemented as program logic executable by at least one processor of a computer system, e.g., as functions, routines, or code snippets that are executable.

A second set of features is extracted using Word2vec, which is a method adopted in natural language processing and information retrieval applications. Word2vec in the context of this application can be used to efficiently create word embeddings, i.e., converting words/strings into a fixed-size numeric vector. This operation allows for the capturing of a word's context in a document, semantic and syntactic similarity, and relation with other words. Certain example embodiments train a standard word-embedding model where each tuple is considered to be a document. For each word, a vector is generated to capture the dependence between this word and its context.

The TF-IDF method is a statistical measure that estimates how important a word, character, or n-gram is, in a corpus of documents. For the purposes of understanding the terms corpus and document in this example, it is noted that in the error detection context, each single value in a column may be thought of as representing a document, where the values in the entire column constitute the corpus. In certain example embodiments, the TF-IDF method is implemented on the character-level, where each value is assigned a vector of TF-IDF values for a particular character. The TF-IDF values are computed by multiplying two metrics: how many times a character appears in a document, and the inverse document frequency of the character across the corpus.

As will be appreciated from the FIG. 4 example table, the labels are Boolean values that denote whether each value is erroneous. That is, entries labeled with 0 are deemed not erroneous, and entries labeled with 1 are deemed erroneous. For the historical datasets, these labels typically are obtainable from previous cleaning tasks. In other words, the historical data are previously cleaned and accordingly provide labels to the base classifiers.

Example Knowledge Extraction Phase Related Techniques

In the offline knowledge extraction phase, multiple datasets are collected from previous tasks. The datasets have different types of data, e.g., numerical, categorical, textual, dates, etc. For each column in these datasets, a feature vector is generated for each tuple, as demonstrated in FIG. 5. That is, FIG. 5 shows the generation of feature vectors, including zero padding, in accordance with certain example embodiments. After generating the features, a set of classifiers is trained, where labels are provided from previous cleaning tasks. These models are to be used in the error detection phase to generate meta-features, so the feature vectors preserve the same shape as the features extracted from the dirty dataset. More particularly, the number of generated features for each column depends at least in part on the content of the respective column. In this case, the base classifiers, trained in the knowledge extraction phase, may be directly usable with other dirty datasets, e.g., because of their different shapes. To overcome this challenge, padding is used to achieve a fixed length m for all feature vectors. Padding techniques are known to be used in convolutional neural networks for processing images, etc. In certain example embodiments, zero padding is adopted, where each feature vector $F \in \mathbb{R}^t$, where t<m, is extended through inserting m-t columns containing zeros. Accordingly, all feature vectors will have a fixed size of m. FIG. 5 depicts an example where the "city" column results in only n features. Because n is less than m in this case, the extracted features cannot be used "as is" because of the divergent shapes of the vectors. But as can be seen in the right side of the FIG. 5, zero padding adds a set of zero columns to reach the pre-defined size of the feature vector. Thus, FIG. 5 shows the evolution from a dirty dataset to an extracted column, to a set of extracted column features, to a vector with zero-padded features. This m-vector is provided to a pre-trained classifier to generate meta-level features.

Example Error Detection Phase Related Techniques

In this online phase, the knowledge embedded in the base classifiers generated from different but related tasks is exploited to help detect errors in dirty datasets. FIG. 6 depicts an error detection algorithm in accordance with certain example embodiments. It takes as inputs the base classifiers, trained in the knowledge extraction phase, as well as the dirty dataset to be processed, to detect the erroneous samples existing in the dirty dataset. Before proceeding with error detection, a determination is made as to whether the retrieved base classifiers are relevant to the dirty dataset that is to be processed. Therefore, an irrelevant knowledge exclusion procedure is carried out. If all base classifiers in the model inventory are employed to generate the meta-level features, then it is likely that at least some irrelevant knowledge also will be utilized in the detection phase. For instance, assume that the dirty dataset, in the detection phase, has only numerical data values. Accordingly, base classifiers trained on textual or categorical data values are quite likely to represent irrelevant knowledge that should be deliberately excluded when generating the meta-level features.

Clustering the base classifiers serves as a workaround for precisely selecting the most relevant meta-level features. A K-Means clustering approach may be used to generate k clusters, where each cluster comprises the most similar feature vectors of the historical datasets. As can be seen in line 3 of the FIG. 6 example algorithm, the features used to train the K-Means clustering method are the distribution of each character and a set of metadata, including (1) the fraction of unique values in a column, (2) the fraction of explicitly specified missing values, (3) the fraction of alphabetical values of a column, (4) the fraction of numeric values in a column, (5) the fraction of values in a column with punctuation, and (6) the fraction of different values of a column. It will be appreciated that different clustering algorithms may be used in different example embodiments. Furthermore, it will be appreciated that the above-listed and/or other items may be used in the training approach implemented in different example embodiments. In certain example embodiments, the generation of the clustering model is performed in the offline phase, whereas the clustering model is used in the online phase to assign the new dirty dataset to one of the clusters. In certain example embodiments, in the online phase, only the base classifiers that exist in that cluster are used to generate the meta-features while the base classifiers in other clusters are ignored.

After generating the clustering features $F^{(cls)}$, a clustering model $M_{cls}$ is trained where the indices of all clusters and their corresponding models are obtained. See line 8 in FIG. 6. Here, a mapping function assigns the base classifiers to the various clusters. The result of such a step is a dictionary, referred to in the FIG. 6 algorithm as groupedModels, where the keys are the cluster indices and the values represent the corresponding models, i.e., base classifiers. To help reduce the likelihood of irrelevant knowledge being retrieved, the clustering features are extracted from the dirty dataset, as indicated in line 9 of the FIG. 6 example algorithm. Afterward, the K-Means model is used to assign each column of the dirty dataset to one of the clusters. For example, column $a_i$ is assigned to a cluster whose index is referred to as cluster_index. In line 14 of FIG. 6, the set of base classifiers $M_{dirty}$ corresponding to this cluster index is retrieved.

To generate the meta-features $F^{(meta)}$ the base classifiers are adopted. To this end, the feature representations of the dirty dataset are extracted. The FIG. 6 example algorithm at line 16 begins with the TF-IDF features. Then, the shapes of the resultant feature vectors $|F_i^{(tf-idf)}|$ are compared with the shapes of features extracted in the historical phase $\alpha_{hist}$. If both shapes are not the same, the feature vectors of the dirty dataset are concatenated with zeros to achieve a fixed-size feature vector, as demonstrated in line 20 of FIG. 6. Thereafter, the Word2vec and metadata features are extracted, as explained above. These features are used to generate the meta-features, as indicated in lines 24-25 of FIG. 6. The meta-classifier is trained in connection with a set of labels. Certain example embodiments leverage an active learning approach to select a set of samples for an oracle to decide whether these samples are erroneous. Alternatively or in addition, the meta-classifier can be pre-trained, e.g., to help reduce or even eliminate the need for a user to label the meta-classifier. A variety of different algorithms can be used. However, it is noted that the multi-layer perceptron (MLP) algorithm was found during testing to have better accuracy compared to other ML models, such as random forest and decision trees. In any event, the trained meta-classifier is used for classifying the state of each data sample, as indicated in line 29 of FIG. 6, i.e., whether the data sample is erroneous. The output of the meta-classifier is in the form of a table (or other structure) comprising the indices (or other identifications) of the cells classified as erroneous. To make use of this table, a suitable data repair algorithm is adopted to generate a set of repair candidates. Currently, there are several methods for generating repair candidates, such as ML-based imputation, deduplication, and ML-based holistic data repair algorithms Because of the improvement to the quality of the data, the performance of the predictive models, e.g., classification, clustering, or regression, will be highly enhanced.

Figure 7:
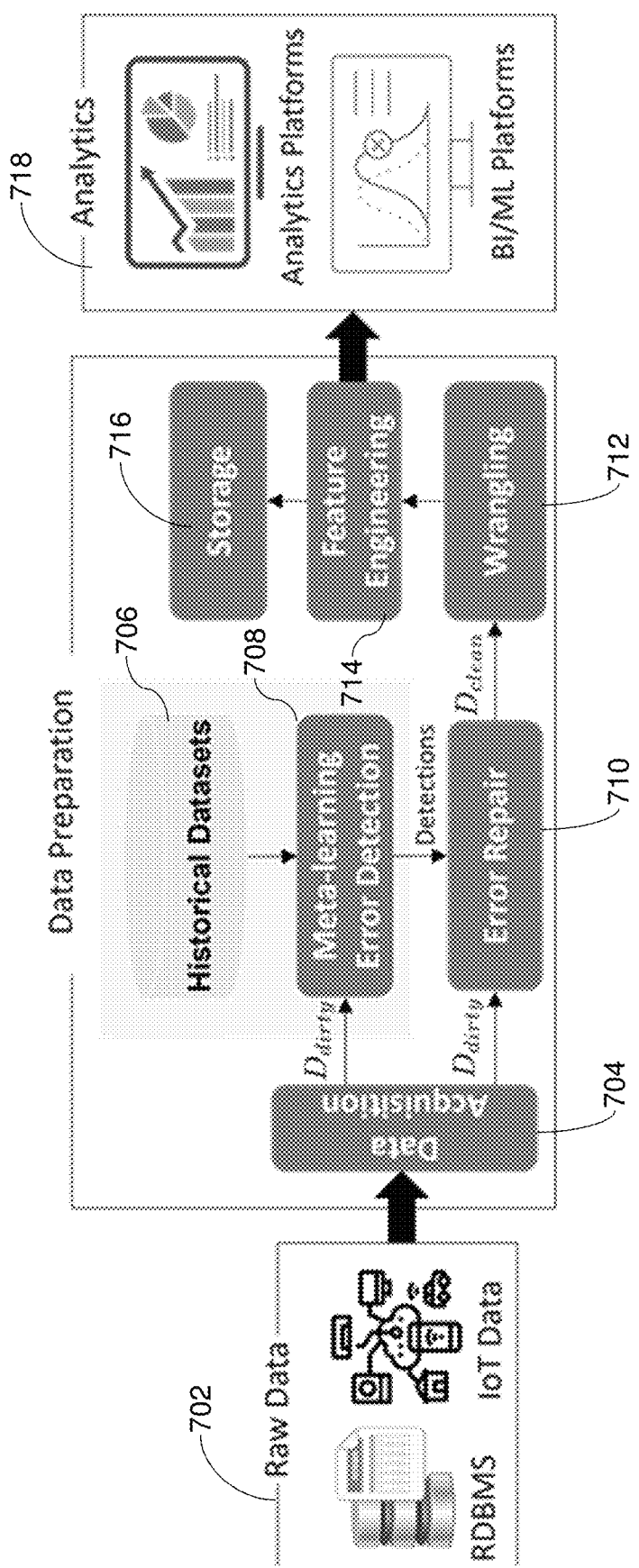
FIG. 7 is a block diagram showing how the techniques disclosed herein can be used in connection with a machine learning pipeline.

FIG. 7 is a block diagram showing how the techniques disclosed herein can be used in connection with a machine learning pipeline. FIG. 7 includes raw data 702, which may be a dirty dataset including sensor readings from IoT or other sensors, smarty traffic system related data, online marketplace related data, financial data, and/or the like. This data may be stored in to a data store, e.g., as a CSV files, in a database (e.g., a relational database), and/or in any other format. The raw data 702 is acquired over a data acquisition interface 704 (e.g., via API calls, web service calls, direct accession, and/or any other suitable computer-mediated means).

A preparation phase begins with identifying the erroneous data samples. The techniques of certain example embodiments can be adopted here to highly improve the detection accuracy, e.g., because knowledge embedded in the historical datasets 706 can be leveraged, e.g., through the use of a meta-learning based error detection module 708. This error detection module 708 may help perform the operations outlined in FIG. 6, and it may be supported by a computing system including at least one processor and a memory. The memory may store instructions (e.g., those outlined in FIG. 6), which may be performed to accomplish the error detection.

The output from the meta-learning based error detection module 708 may be a table or the like (e.g., stored as a CSV file or in any other suitable format). It may include the indices or other identifiers of the erroneous samples in the raw data 702. The table or other structure may be at least temporarily stored to a data store, and it may be used as an input to a suitable data repair algorithm 710. For instance, if the raw input data contains an entry of 200 for the age of a patient, then this erroneous entry will be detected by the meta-learning error detection module 708, and its index will be forwarded to the repair algorithm 710. In this case, the repair algorithm 710 will either remove this entry or replace it with a newly-generated value, e.g., the mean of other values in the age attribute, a user-supplied value, and/or the like.

After the entries are repaired, the cleaned data is subjected to several transformations (or data wrangling operations 712), such as normalization and standardization, which in some instances may be needed for a proper adoption of predictive models or other post-cleaning tools. Via feature engineering 714, the most representative set of features are extracted and irrelevant features are excluded. Afterward, the extracted features are stored to a data store 716. These stored features may be provided to an analytics engine 718, e.g., to power different analytics tasks that may include, for example, the use of predictive models, business intelligence, and/or the like.

Although certain example embodiments refer to "columns," as is understood by those skilled in the art, this term is to be construed broadly to encompass any feature in a dataset, regardless of whether the data in that dataset is arranged as a table or database having rows and columns. In other words, data stored in XML databases, flat files, and/or the like can be deemed to have "columns" of data.

It will be appreciated that as used herein, the terms system, subsystem, service, engine, module, programmed logic circuitry, and the like may be implemented as any suitable combination of software, hardware, firmware, and/or or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of training a meta-learning based error detection system, the method comprising:
    having access to historical datasets that each include historical data and historical data attributes, as well as a plurality of base classifiers that are each for a historical attribute for each of the historical datasets, each one of the plurality of base classifiers being pre-trained to classify between clean and dirty data, wherein historical clustering features are determined for each historical attribute in each historical dataset, and wherein clusters of a cluster model are generated based on determined historical clustering features for each historical attribute in each historical dataset;
    accessing a dirty dataset that includes dirty data and a plurality of dirty attributes;
    automatically generating, for each one of the plurality of dirty attributes in the dirty dataset, corresponding dirty clustering features;
    assigning, based on the corresponding dirty clustering features that are generated, each one of the plurality of dirty attributes of the dirty dataset to one of the clusters of the cluster model, wherein the base classifier for each historical attribute is associated with at least one of the clusters of the cluster model;
    selecting, from the plurality of base classifiers and for each assigned one of the plurality of dirty attributes, at least one base classifier based on which cluster(s) in the cluster model that a corresponding dirty was assigned;
    automatically generating for each corresponding dirty attribute of the plurality of dirty attributes in the dirty dataset, corresponding dirty features that describe data for the corresponding dirty attribute of the dirty dataset;
    selectively modifying the automatically generated dirty features to conform to expected inputs of the selected base classifiers;
    generating a set of meta-features by transforming the set of dirty features into the set of meta-features by using the at least one selected base classifier;
    obtaining labels for the generated meta-features;
    generating, based on the labeled meta-features, a new meta-classifier for use against the dirty dataset; and
    predicting based on the newly generated meta-classifier and for a plurality of respective samples of the dirty dataset, about whether a state of the respective data sample of the dirty dataset is erroneous.

2. The method of claim 1, wherein the historical datasets are structured datasets.

3. The method of claim 1, wherein the historical clustering features include distribution information and metadata associated with the corresponding historical attributes.

4. The method of claim 1, wherein the clusters and the base classifier for each historical attribute are generated using a K means clustering algorithm.

5. The method of claim 1, wherein the dirty clustering features are determined based on character distribution and metadata.

6. The method of claim 1, wherein the selective modifying includes applying zero-padding to match an expected dimension of the selected base classifiers.

7. The method of claim 1, further comprising using active learning to limit the number of labels obtained from an expert in connection with the obtaining of labels for the determined meta-features.

8. The method of claim 1, wherein the meta-classifier is trained using a multi-layer perceptron (MLP) algorithm.

9. The method of claim 1, wherein the meta-classifier is trained classify data cells in the dirty dataset that are erroneous.

10. A method of repairing data in a dirty dataset, the method comprising:
    using the meta-learning based error detection system of claim 1 to make predictions about the dirtiness of the dirty dataset based on the meta-classifier; and
    generating a set of repair candidates based on the predictions made.

11. The method of claim 10, wherein the repair candidates are generated based on a machine-learning (ML) based imputation, deduplication, and/or holistic data repair algorithm.

12. A non-transitory computer readable storage medium tangibly storing instructions that, when performed by a processor of a computing system, perform the method of claim 10.

13. A non-transitory computer readable storage medium tangibly storing instructions that, when performed by a processor of a computing system, perform the method of claim 1.

14. A meta-learning based error detection system, comprising:
    at least one processor and a memory, the at least one processor being configured to at least:
        access, from a first data store, historical datasets that each include historical data and historical data attributes, as well as a base classifier for each historical attribute for each of the historical datasets, each base classifier being pre-trained to classify between clean and dirty data, wherein historical clustering features are determined for each historical attribute in each historical dataset, and wherein clusters of a cluster model are generated based on determined historical clustering features for each historical attribute in each historical dataset;
        access, from a second data store, a dirty dataset that includes dirty data and a plurality of dirty attributes;
        automatically generate, for each one of the plurality of dirty attributes in the dirty dataset, corresponding dirty clustering features;
        assign, based on the corresponding dirty clustering features that are generated, each one of the plurality of dirty attributes of the dirty dataset to one of the clusters of the cluster model, wherein the base classifier for each historical attribute is associated with at least one of the clusters of the cluster model;

select, from among a plurality base classifiers and for each assigned one of the plurality of dirty attributes, the base classifier(s) that is/are associated with the cluster(s) in the cluster model that a corresponding dirty attribute was assigned;

automatically generate, for each corresponding dirty attribute of the plurality of dirty attributes in the dirty dataset, corresponding, dirty features that describe data for the corresponding dirty attribute of the dirty dataset;

selectively modify the automatically generated extracted dirty features to conform to expected inputs of the selected base classifiers;

generate a set of meta-features by transforming the set of dirty features into the set of meta-features by using the at least one selected base classifier;

obtain labels for the generated meta-features;

generating, based on the labeled meta-features, a new meta-classifier for use against the dirty dataset; and predict, based on the newly generated meta-classifier and for a plurality of data samples of the dirty dataset, about whether a state of a respective data sample of the dirty dataset is erroneous.

15. The system of claim 14, wherein the historical datasets are stored in a relational database.

16. The system of claim 14, wherein the clustering features include first distribution information and first metadata associated with the corresponding historical attributes, and wherein the dirty features include second distribution information and second metadata associated with the corresponding dirty attributes.

17. The system of claim 14, wherein the selective modifying includes applying zero-padding to match an expected dimension of the selected base classifiers.

18. The system of claim 14, wherein the meta-classifier is trained to classify data cells in the dirty dataset that are erroneous.

19. The system of claim 14, wherein predictions about the dirtiness of the dirty dataset are made based on the trained meta-classifier, and repair candidates are generated based on the predictions made.

20. The system of claim 19, wherein the repair candidates are generated based on a machine-learning (ML) based imputation, deduplication, and/or holistic data repair algorithm.

* * * * *